United States Patent
Blayvas et al.

(10) Patent No.: US 8,659,698 B2
(45) Date of Patent: Feb. 25, 2014

(54) COMPACT 3D SCANNER WITH FIXED PATTERN PROJECTOR AND DUAL BAND IMAGE SENSOR

(76) Inventors: Ilya Blayvas, Jerusalem (IL); Ron Kimmel, Haifa (IL)

(*) Notice: Subject to any disclaimer, the term of this patent is extended or adjusted under 35 U.S.C. 154(b) by 605 days.

(21) Appl. No.: 11/750,029

(22) Filed: May 17, 2007

(65) Prior Publication Data

US 2008/0285056 A1    Nov. 20, 2008

(51) Int. Cl.
*H04N 5/222*    (2006.01)
*G01B 11/30*    (2006.01)

(52) U.S. Cl.
USPC ............ 348/370; 348/135; 348/275; 356/603

(58) Field of Classification Search
USPC .................................................. 348/136, 370
See application file for complete search history.

(56) References Cited

U.S. PATENT DOCUMENTS

| | | | |
|---|---|---|---|
| 6,252,623 B1* | 6/2001 | Lu et al. ........................... | 348/47 |
| 6,369,899 B1* | 4/2002 | Hamada ......................... | 356/603 |
| 6,438,272 B1* | 8/2002 | Huang et al. ................... | 382/286 |
| 6,559,954 B2* | 5/2003 | Takata et al. ................... | 356/604 |
| 6,759,646 B1* | 7/2004 | Acharya et al. ................ | 250/226 |
| 6,937,348 B2* | 8/2005 | Geng ............................. | 356/603 |
| 7,092,563 B2* | 8/2006 | Shiratani ....................... | 382/154 |
| 7,274,393 B2* | 9/2007 | Acharya ........................ | 348/273 |
| 7,349,104 B2* | 3/2008 | Geng ............................. | 356/603 |
| 7,388,679 B2* | 6/2008 | Yoshino et al. ................ | 356/603 |
| 7,525,669 B1* | 4/2009 | Abdollahi ...................... | 356/603 |
| 7,564,019 B2* | 7/2009 | Olsen et al. ................. | 250/208.1 |
| 7,566,855 B2* | 7/2009 | Olsen et al. ................. | 250/208.1 |
| 7,576,845 B2* | 8/2009 | Asakura et al. ................. | 356/73 |
| 7,684,052 B2* | 3/2010 | Suwa et al. .................... | 356/601 |
| 8,134,637 B2* | 3/2012 | Rossbach et al. ............. | 348/348 |
| 8,139,141 B2* | 3/2012 | Bamji et al. ................... | 348/348 |
| 8,243,285 B2* | 8/2012 | Fishbaine ...................... | 356/603 |
| 2004/0085448 A1* | 5/2004 | Goto et al. .................... | 348/148 |
| 2005/0088529 A1* | 4/2005 | Geng ........................ | 348/207.99 |
| 2008/0055246 A1* | 3/2008 | Okayama et al. ............. | 345/158 |
| 2009/0268043 A1* | 10/2009 | Olsen et al. ................. | 348/218.1 |

\* cited by examiner

*Primary Examiner* — Ngoc-Yen Vu
(74) *Attorney, Agent, or Firm* — Trop Pruner & Hu, P.C.

(57) ABSTRACT

A structured light 3D scanner consisting of a specially designed fixed pattern projector and a camera with a specially designed image sensor is disclosed. A fixed pattern projector has a single fixed pattern mask of sine-like modulated transparency and three infrared LEDs behind the pattern mask; switching between the LEDs shifts the projected patterns. An image sensor has pixels sensitive in the visual band, for acquisition of conventional image and the pixels sensitive in the infrared band, for the depth acquisition.

11 Claims, 4 Drawing Sheets

A scheme of the fixed pattern projector, according to the present invention.

|   |   |   |   |   |   |
|---|---|---|---|---|---|
| R | G | R | G | R | G |
| B | IR | B | IR | B | IR |
| R | G | R | G | R | G |
| B | IR | B | IR | B | IR |
| R | G | R | G | R | G |
| B | IR | B | IR | B | IR |

FIG 3. A filter arrangement on the color CMOS image sensor or color CCD, according to one of the embodiments of the present invention.

|   |   |   |   |   |   |
|---|---|---|---|---|---|
| C | M | C | M | C | M |
| Y | IR | Y | IR | Y | IR |
| C | M | C | M | C | M |
| Y | IR | Y | IR | Y | IR |
| C | M | C | M | C | M |
| Y | IR | Y | IR | Y | IR |

FIG 4. A complementary color filter arrangement on the color CMOS image sensor or color CCD, according to one of the embodiments of the present invention.

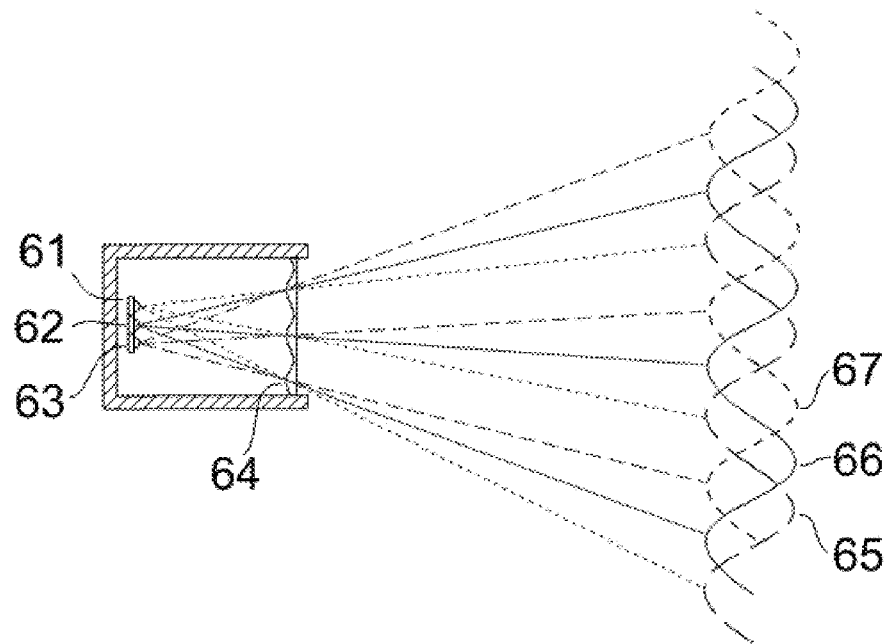
FIG 5. A filter arrangement on the gray level CMOS image sensor or gray level CCD, according to one of the embodiments of the present invention.
FIG. 6. A scheme of the fixed pattern projector, according to the present invention.

COMPACT 3D SCANNER WITH FIXED PATTERN PROJECTOR AND DUAL BAND IMAGE SENSOR

CROSS REFERENCE TO RELATED APPLICATION

| | | | |
|---|---|---|---|
| 7,057,654 | June 2006 | Roddy et al. | 348/277; 348/279 |
| 6,788,210 | September 2004 | Huang et al. | 340/612; 382/154; 382/286 |
| 6,781,676 | August 2004 | Wallace et al. | 356/4.03; 250/221; 250/559.29; |
| 6,885,464 | April 2005 | Pfeiffer et al. | 356/602; 356/603; 433/29 |
| 6,057,909 | May 2000 | Yahav et al. | 356/5.04; 313/103CM; 313/105CM; |
| 5,965,875 | October 1999 | Merrill | 250/226; 250/208.1; 250/214.1; |
| 4,802,759 | February 1989 | Matsumoto et al. | 356/603; 356/3.03; 702/167 |
| 4,687,326 | August 1987 | Corby Jr. | 356/5.01; 2, 5.04, 141.4, 141.5, 348/169 |
| 4,611,292 | September 1986 | Ninomiya et al. | 702/153; 152 348/94; 382/153; |

[1] A. M. Bronstein, M. M Bronstein, R. Kimmel, "Three-dimensional face recognition", Intl. Journal of Computer Vision (IJCV), Vol. 64/1, pp. 5-30, August 2005.

[2] S. Zhang and P. Huang, "High-resolution Real-time 3D Shape Acqusition", CVPRW, 2004.

STATEMENT REGARDING FEDERALLY SPONSORED RESEARCH OR DEVELOPMENT

Not Applicable.

REFERENCE TO SEQUENCE LISTING

Nor Applicable.

BACKGROUND OF THE INVENTION

This invention belongs to the field of structured light 3D scanners. 3D scanners acquire a three dimensional shape of the object and are used in multiple applications, such as: Security applications, where a 3D scan of the face is performed for the sake of further face recognition [1]; Medical applications, such as 3D scanning of the dental area (U.S. Pat. No. 5,386,292); robot navigation (U.S. Pat. No. 4,611,292); Numerous other established and emerging applications.

Conventional image is a projection of a three dimensional scene onto a two dimensional image plane, and therefore the depth information is lost. Consider FIG. 1. A point C on the image sensor 16 of the camera 14 may correspond to either point A or point B, or any other point, lying on the ray 17.

A structured light 3D scanner consists of two main parts: a pattern projector and a camera. A pattern projector projects one or more patterns onto the object. The patterns are designed to allow determining the corresponding projector ray from the acquired images. Knowing that point C corresponds to projector ray 18, allows determining the distance to the point A by triangulation.

The projected patterns can be in the visible or infrared band. If the projected patterns are in the visible band, then an uncontrolled ambient illumination may interfere with the pattern, reducing the system accuracy, the projected pattern hinders the simultaneous acquisition of conventional image. In the security applications, like 3D scanning of the human faces, a pattern in the visible band disturbs the scanned individuals and gives away the system operation.

The projected patterns in the infrared band allow overcoming the above limitations. However, use of the infrared illumination requires use of a special infrared-sensitive camera, and therefore a simultaneous acquisition of the image in the visible band requires an additional camera. This increases the size, weight and cost of a 3D scanning system.

The projected patterns in the prior art are usually generated by the digital light projector [1,2]. FIG. 7 shows an infrared structured light 3D scanner in the prior art. A digital light projector 71 generates the patterns, an infrared filter 72 cuts off the visible band, and transmits only the infrared patterns; a signal reflected from the object 73 is divided by a semitransparent mirror 74 between the infrared camera 75, acquiring the patterns and the visible band camera 76, acquiring conventional images. This system is relatively expensive, bulky, and energy consuming, which prohibits many applications of the prior art 3D scanners.

The object of this invention is to provide a design of a structured light 3D scanner, comparable in the size and manufacturing cost with the simplest webcams, and possessing the webcam functionality. In other words the object of this invention is to add a 3D scanner functionality to a webcam, with only negligible increase of its size and manufacturing cost.

BRIEF SUMMARY OF THE INVENTION

The present invention is a structured light 3D scanner, consisting of a camera with a specially designed image sensor and a specially designed pattern projector. An image sensor is designed so, that some of its pixels are sensitive in the visual band, while some other pixels are sensitive in the infrared band. This allows acquiring a conventional image and a stealth 3D scan in the infrared band by a single camera in the system.

In prior art color image sensors, the green pixels are redundant, since for each one blue and one red pixel there are two green pixels, as shown on FIG. 2. Therefore, converting one of the green pixels into the infrared pixel does not decrease the sensor resolution. The infrared sensitive pixels are created via the deposition of infrared transmitting filter.

When the image is acquired by an invented image sensor, the information from the visible band pixels is used to construct a conventional image, while the information from the infrared pixels is used to construct an infrared image. We call an invented image sensor a "dual band" image sensor, since it simultaneously acquires images in the infrared and in the visible bands. The dual band image sensor requires only one additional type of filter, and its manufacturing cost is only negligibly higher than the manufacturing cost of conventional sensor. Use of dual-band image sensor does not requires a change of the camera design, since it has the same interface with the camera as the conventional image sensor; the camera acquires the full frame picture, containing both the infrared and the visible band pixels, which are discriminated in the image processing.

An invented fixed pattern projector has a single pattern mask and several LEDs behind it. Switching between the LEDs shifts the projected pattern, as shown on FIG. 6. One of the particularly efficient patterns for structured light 3D scanners is a set of three phase-shifted sine patterns ([2], U.S. Pat. No. 6,559,954, U.S. Pat. No. 6,438,272). In specific embodiment of this invention, three phase shifted sine patterns are generated by a pattern mask with sine profile on it and three infrared LEDs behind the mask. The invented projector is compact, measuring only several millimeters in each dimension and has low manufacturing cost.

The 3D scanner using the disclosed designs of the dual-band image sensor and the fixed pattern projector has functionality of a conventional camera and an infrared 3D scanner, while its size and manufacturing cost are almost same as of the camera alone.

BRIEF DESCRIPTION OF THE DRAWINGS

FIG. 3 shows a filter arrangement on the dual-band color CMOS image sensor or dual-band color CCD, according to one of the embodiments of the present invention.

FIG. 4 shows a filter arrangement in complementary colors on the dual-band color CMOS image sensor or dual-band color CCD, according to one of the embodiments of the present invention.

FIG. 5 shows a filter arrangement on the gray level CMOS image sensor or gray level CCD, according to one of the embodiments of the present invention.

FIG. 6 shows a scheme of the fixed pattern projector, according to the present invention.

DETAILED DESCRIPTION OF THE PREFERRED EMBODIMENT

Figures 1, 2:
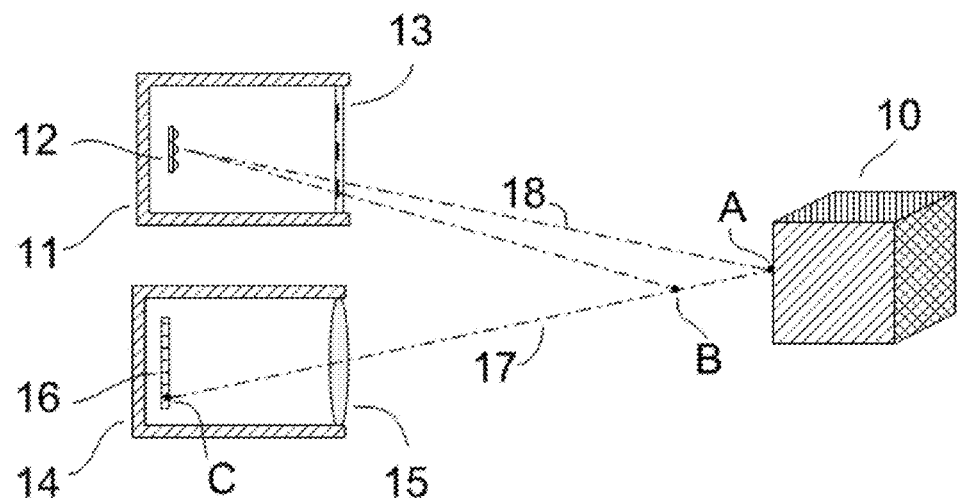
FIG. 1 shows a scheme of structured light 3D scanner, according to the present invention.
FIG. 2 shows a typical filter arrangement on the color CMOS image sensor or color CCD, according to the prior art.
Figure 7:
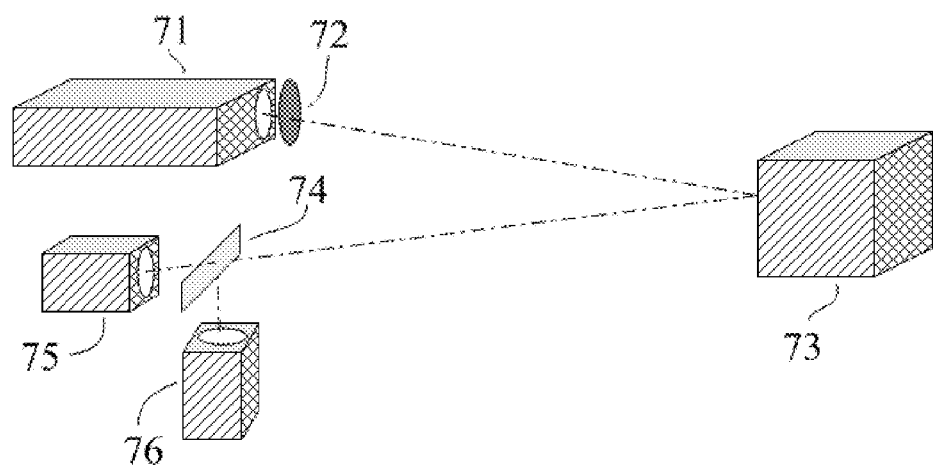
FIG. 7 shows a scheme of the infrared structured light 3D scanning system, according to the prior art.

FIG. 1 shows a 3D scanner consisting of a pattern projector 11 and a camera 14. The pattern projector 11 consists of several infrared light emitting diodes 12 and a pattern mask 13. The camera 14 has a lens 15 and an image sensor 16. The 3D scanner operates as follows: the first infrared LED turns on, and projects a first pattern through the pattern mask 13 on the object 17. The image of the object and the first infrared pattern projected on it is focused by the lens 15 on the image sensor 16. The image sensor has pixels sensitive to the visible band and to the infrared band. The pixels sensitive to the visible band acquire the conventional image of the object under the natural illumination. The pixels sensitive to the infrared acquire the infrared image of object with the infrared pattern projected on it. Then the first LED is switched off and the second LED is switched on, projecting the second pattern. The second image is acquired with the pixels in the visible band containing conventional image of the object and the infrared pixels containing the image of the second infrared pattern. This process is repeated n times (where n is one or more), for each of the n LEDs. At the end of the process there are n images of the object in the visible band under natural illumination, and n images in the infrared band, with the object illuminated by n different (or shifted) infrared patterns. Processing of the infrared images, allows reconstruction of the 3D shape of the object. Conventional images of the object from the visible band allow simultaneous use of the system as a conventional camera, for example as a conventional webcam.

FIG. 2 shows one of the embodiments of the prior art color CMOS image sensor or CCD. The color filters are arranged in the repeated 2×2 groups, with one red, two green and one blue filter in each group. 21 shows such a 2×2 group. R denotes a red filter, G denotes a green filter, and B denotes a blue filter.

FIG. 3 shows one of the embodiments of an invented dual-band CMOS image sensor or dual-band color CCD. R denotes a red filter, G denotes a green filter, B denotes a blue filter, IR denotes an infrared filter, transmitting in the infrared and absorbing in the visible band. Replacement of one of the green pixels with the infrared pixel, (R, G, G, B)→(R, G, B, IR) preserves the color information, since the replaced second green pixel was redundant.

FIG. 4 shows another embodiment of an invented dual-band CMOS image sensor or dual-band color CCD. C denotes a cyan filter, M denotes a magenta filter, Y denotes a yellow filter, IR denotes an infrared filter, transmitting in the infrared and absorbing in the visible band.

FIG. 5 shows the filter arrangement of the invented dual-band gray level CMOS image sensor or dual-band grey level CCD. B/W denotes a gray level pixel, sensitive to the visible band. IR denotes a pixel sensitive to the infrared band.

FIG. 6 shows one of the embodiments of an invented fixed pattern projector. When the LED 61 is switched on, the pattern mask 64 projects a pattern 65. When the LEDs 62 and 63 are switched on, the pattern mask 64 projects correspondingly patterns 66 and 67.

The pattern mask 64 has the transparency modulated by the singe wave with period D. The LEDs are vertically spaced by the distance D/3. Therefore, the projected sine patterns are mutually phase-shifted by $2\lambda/3$. The infrared images acquired with the first, second and third projected patterns are denoted as $I_1$, $I_2$ and $I_3$. The phase $\phi$ of the projected pattern is obtained from the three images as: $\phi=\arctan[\sqrt{3}(I_1-I_3)/(2I_2-I_1-I_3)]$ [2], which can be verified via the trigonometric equalities. Knowing the phase $\phi$ of the projected pattern for each pixel allows the 3D reconstruction of the shape by triangulation [2].

The invention claimed is:

1. A 3D scanning apparatus, comprising:
a camera with a dual-band image sensor, with some pixels sensitive in the visible optical band and some other pixels sensitive in the invisible optical band;
a fixed pattern projector, having a single fixed mask of varying transparency and two or more infrared light sources behind said single fixed pattern mask having different relative positions, configured to project patterns in the invisible optical band on an object; wherein said camera is configured to acquire a visible light image of the object and an invisible light image of the object and the patterns, said visible and visible light images captured at the same time, and to reconstruct a 3D shape of the object based on said acquired patterns;
wherein said projected pattern varies according to the combination of spatial variance of the single pattern mask and a difference between the different relative positions; and
wherein the pattern mask has a sine-function varying transparency having a period D, and three infrared light emitting diodes placed at distances D/3 so that sequential switching between them results in sequential projection of three sine-modulated patterns, mutually phase shifted by $2\pi/3$.

2. Apparatus according to claim 1, wherein said pixels sensitive in the visible band are tiled in an interlaced manner with said pixels sensitive in the invisible band.

3. Apparatus according to claim 1, wherein said camera further comprises three types of color filters and fourth type of filter filtering in the infrared band.

4. Apparatus as in claim 3, wherein said image sensor comprises a plurality of groups of pixels, each group of pixels having, in a two-by-two quadrangular arrangement, a pixel transmitting in the red, a pixel transmitting in the green, a pixel transmitting in the blue and a pixel transmitting in the infrared.

5. Apparatus as in claim 3, wherein said image sensor comprises a plurality of groups of pixels, each group of pixels having, in a two-by-two quadrangular arrangement a pixel transmitting in the cyan, a pixel transmitting in the magenta, a pixel transmitting in the yellow and a pixel transmitting in the infrared.

6. Apparatus according to claim 1, wherein said single pattern mask has a sine-like varying transparency.

7. A method of constructing a three-dimensional shape of an object, comprising:

projecting patterns in the invisible optical band on the object with the scanning apparatus of claim 1;

using a dual band image sensor having some pixels sensitive in the visible optical band and some other pixels sensitive in the invisible optical band for acquiring a visible light image of the object and an invisible light image of the object and said patterns with the scanning apparatus of claim 1; and reconstructing the three-dimensional shape of the object based on said acquired patterns.

8. A method according to claim 7, wherein said projecting said patterns is sequential.

9. A method according to claim 8, wherein said dual-band image sensor comprises a plurality of groups of pixels, each group of pixels having, in a two-by-two quadrangular arrangement, three pixels respectively transmitting in three different visible bands and one pixel transmitting in the invisible optical band.

10. A method according to claim 9, wherein said three different visible bands are selected from the group consisting of (i) red, green and blue optical bands, and (ii) cyan, magenta and yellow optical bands.

11. A method according to claim 9, wherein said invisible optical band comprises an infrared band.

* * * * *